United States Patent
Aoki

(10) Patent No.: US 10,924,622 B2
(45) Date of Patent: Feb. 16, 2021

(54) MANAGEMENT APPARATUS

(71) Applicant: FUJI XEROX CO., LTD., Tokyo (JP)

(72) Inventor: Takashi Aoki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/595,833

(22) Filed: Oct. 8, 2019

(65) Prior Publication Data

US 2020/0336616 A1    Oct. 22, 2020

(30) Foreign Application Priority Data

Apr. 18, 2019    (JP) .............................. JP2019-079000

(51) Int. Cl.
*H04N 1/00*    (2006.01)
*G06F 3/12*    (2006.01)

(52) U.S. Cl.
CPC ......... *H04N 1/00949* (2013.01); *G06F 3/123* (2013.01); *G06F 3/1204* (2013.01); *G06F 3/1205* (2013.01); *H04N 1/00941* (2013.01)

(58) Field of Classification Search
CPC ........... H04N 1/00949; H04N 1/00941; H04N 1/00938; H04N 1/00503; G06F 3/1204; G06F 3/1205; G06F 3/123; G06F 21/12
See application file for complete search history.

(56) References Cited

U.S. PATENT DOCUMENTS

| | | | |
|---|---|---|---|
| 9,807,180 B2 | 10/2017 | Itasaki et al. | |
| 10,394,500 B2 | 8/2019 | Nakajima et al. | |
| 2004/0230687 A1* | 11/2004 | Nakamura | H04L 67/10 709/228 |
| 2008/0117442 A1* | 5/2008 | Kosaka | H04N 1/00127 358/1.6 |
| 2017/0269917 A1 | 9/2017 | Matsushima | |
| 2020/0241615 A1* | 7/2020 | Tanase | H02J 7/0048 |

FOREIGN PATENT DOCUMENTS

| | | |
|---|---|---|
| JP | 2004-157676 A | 6/2004 |
| JP | 5975113 B2 | 8/2016 |
| JP | 6050972 B2 | 12/2016 |
| JP | 2017-174410 A | 9/2017 |
| JP | 2018-026087 A | 2/2018 |

* cited by examiner

*Primary Examiner* — Iriana Cruz
(74) *Attorney, Agent, or Firm* — Oliff PLC

(57) ABSTRACT

A management apparatus includes an obtaining unit that obtains a history of communication performed with an external apparatus in accordance with a derivative application program created on a basis of a basic application program and a state control unit that, if the basic application program is made unavailable, controls, using the history of communication, whether to make the derivative application program unavailable.

20 Claims, 12 Drawing Sheets

125

| BASIC APP | DERIVATIVE APP | WORK FLAG | COOPERATION URL | COOPERATION FLAG | FUNCTIONS | USE FREQUENCY |
|---|---|---|---|---|---|---|
| SCAN APP | FIRST CUSTOMIZED APP | true | ... | true | COLOR SCANNING | 5 TIMES/DAY |
| | | | | | BLACK-AND-WHITE SCANNING | ... |
| | | | | | ... | ... |
| ... | ... | ... | ... | ... | ... | ... |

| BASIC APP | DERIVATIVE APP | WORK FLAG | COOPERATION URL | COMMUNICATION HISTORY ||
|---|---|---|---|---|---|
| | | | | COOPERATION FLAG | COMMUNICATION FREQUENCY |
| SCAN APP | FIRST CUSTOMIZED APP | true | ... | true | 10 TIMES/DAY |
| EMAIL APP | SECOND CUSTOMIZED APP | true | ... | true | ... |
| ... | ... | ... | ... | ... | ... |

| APP | STATE INFORMATION |
|---|---|
| SCAN APP | DISABLED |
| FIRST CUSTOMIZED APP | ENABLED |
| ... | ... |

| | | |
|---|---|---|
| ... | | |
| INSTALLED APPS | | |
| ... | ENABLED | DISABLED |
| SCAN APP | ENABLED | DISABLED |
| EMAIL APP | ENABLED | DISABLED |
| ... | ENABLED | DISABLED |
| ... | ENABLED | DISABLED |
| ... | ENABLED | DISABLED |

| BASIC APP | DERIVATIVE APP | WORK FLAG | COOPERATION URL | COOPERATION FLAG | FUNCTIONS | USE FREQUENCY |
|---|---|---|---|---|---|---|
| SCAN APP | FIRST CUSTOMIZED APP | true | ... | true | COLOR SCANNING | 5 TIMES/DAY |
|  |  |  |  |  | BLACK-AND-WHITE SCANNING |  |
| ... | ... | ... | ... | ... | ... | ... |

| APP | FUNCTIONS | STATE INFORMATION |
|---|---|---|
| SCAN APP | COLOR SCANNING | DISABLED |
| | BLACK-AND-WHITE SCANNING | ENABLED |
| | ... | ... |
| FIRST CUSTOMIZED APP | COLOR SCANNING | ENABLED |
| | ... | ... |
| ... | ... | ... |

| BASIC APP | DERIVATIVE APP | WORK FLAG | COOPERATION URL | COOPERATION FLAG | USE PERIOD |
|---|---|---|---|---|---|
| SCAN APP | FIRST CUSTOMIZED APP | true | ... | true | 9 a.m. TO 8 p.m. |
| ... | ... | ... | ... | ... | ... |

| APP | AVAILABLE PERIOD |
|---|---|
| SCAN APP | 9 a.m. TO 5 p.m. |
| FIRST CUSTOMIZED APP | ALWAYS |
| ... | ... |

MANAGEMENT APPARATUS

CROSS-REFERENCE TO RELATED APPLICATIONS

This application is based on and claims priority under 35 USC 119 from Japanese Patent Application No. 2019-079000 filed Apr. 18, 2019.

BACKGROUND

(i) Technical Field

The present disclosure relates to a management apparatus.

(ii) Related Art

Techniques for managing a program are known. In Japanese Patent No. 6050972, for example, a technique for, if an instruction to make an application unavailable is received, obtaining a use history of cooperation applications that operate in cooperation with the application and transmitting, to a user, information regarding cooperation applications necessary for functions that have been used by the user.

SUMMARY

A derivative application program is sometimes created from a basic application program. If the basic application program is disabled in this case, the derivative application program is usually also disabled. When communication is being performed with an external apparatus in accordance with the derivative application program, however, a process performed in relation to the communication might be hindered if the derivative application program becomes unavailable as the basic application program is disabled.

Aspects of non-limiting embodiments of the present disclosure relate to, when a basic application program is made unavailable, prevent a process performed in relation to communication performed with an external apparatus in accordance with a derivative application program of the basic application program from being hindered.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a management apparatus including an obtaining unit that obtains a history of communication performed with an external apparatus in accordance with a derivative application program created on a basis of a basic application program and a state control unit that, if the basic application program is made unavailable, controls, using the history of communication, whether to make the derivative application program unavailable.

BRIEF DESCRIPTION OF THE DRAWINGS

Exemplary embodiments of the present disclosure will be described in detail based on the following figures, wherein:

FIG. 3 is a diagram illustrating an example of an app management table according to the first exemplary embodiment;

FIG. 4 is a diagram illustrating an example of a state control table according to the first exemplary embodiment;

FIG. 10 is a diagram illustrating an example of an app management table according to a fourth exemplary embodiment;

FIG. 11 is a diagram illustrating an example of a state control table according to the fourth exemplary embodiment;

FIG. 13 is a diagram illustrating an example of an app management table according to a fifth exemplary embodiment;

FIG. 14 is a diagram illustrating an example of a state control table according to a fifth exemplary embodiment;

DETAILED DESCRIPTION

1. First Exemplary Embodiment 1.1 Configuration

Figure 1:
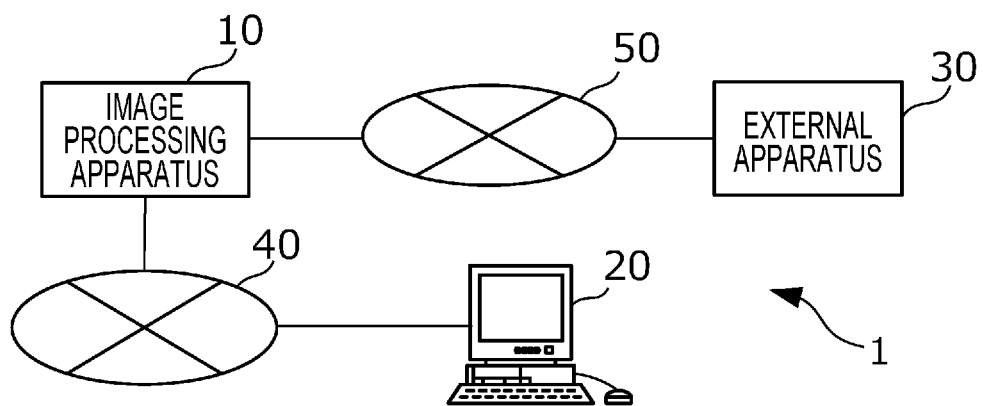
FIG. 1 is a diagram illustrating an example of the configuration of a work cooperation system according to a first exemplary embodiment.

FIG. 1 is a diagram illustrating an example of the configuration of a work cooperation system 1 according to a first exemplary embodiment. The work cooperation system 1 is used to work in cooperation with an outsider. The work cooperation system 1 includes an image processing apparatus 10, a terminal apparatus 20, and an external apparatus 30. The image processing apparatus 10 and the terminal apparatus 20 are connected to each other through a communication line 40 such as a local area network (LAN). The image processing apparatus 10 and the external apparatus 30 are connected to each other through a communication line 50 such as the Internet.

The image processing apparatus 10 has a plurality of functions such as a print function, a copy function, a scan function, and a facsimile function and performs various processes relating to images. The terminal apparatus 20 is a computer having an input/output function and a communication function. The terminal apparatus 20 may be, for example, a personal computer, a smartphone, or a tablet terminal. The terminal apparatus 20 is used, for example, by a user of the image processing apparatus 10 to make various settings relating to the image processing apparatus 10. For example, a browser is installed on the terminal apparatus 20, and these settings may be made through the browser. The external apparatus 30 is a computer having a communication function. The external apparatus 30 is used by a user different from the user of the image processing apparatus 10 and performs processes in cooperation with the image processing apparatus 10. The user of the external apparatus 30 may be, for example, a person belonging to a company different from one to which the user of the image processing apparatus 10 belongs.

Figure 2:
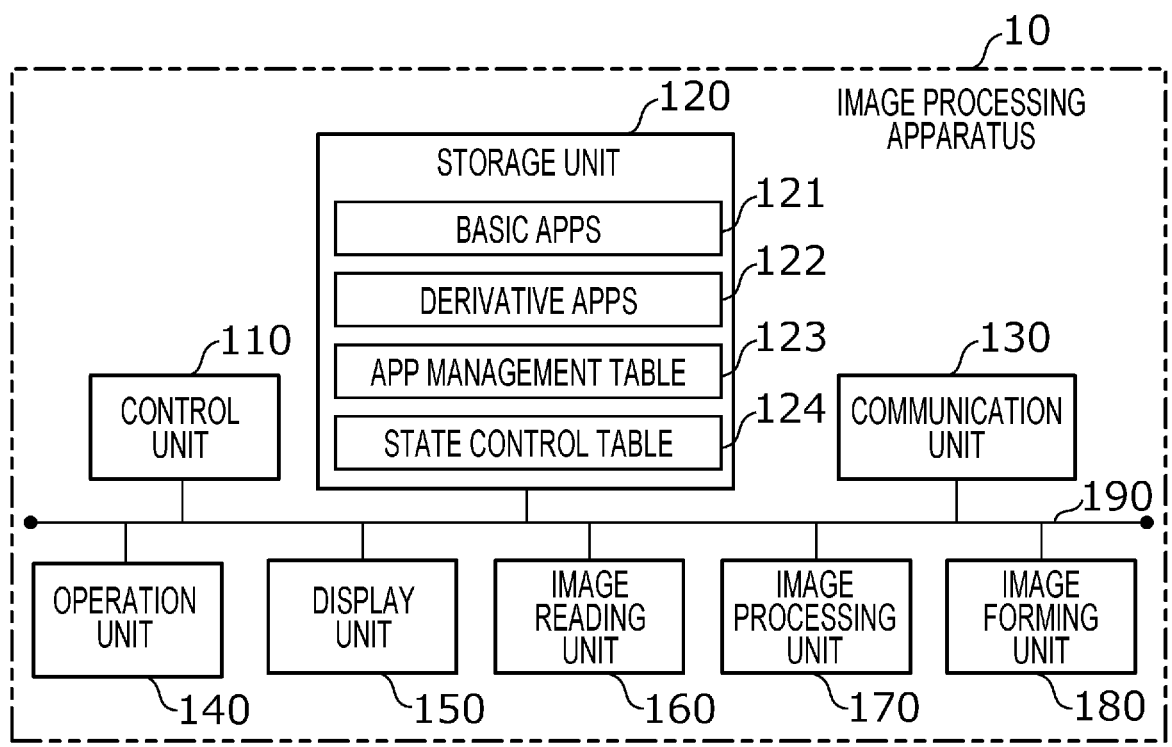
FIG. 2 is a diagram illustrating an example of the hardware configuration of an image processing apparatus according to the first exemplary embodiment.

FIG. 2 is a diagram illustrating an example of the hardware configuration of the image processing apparatus 10. The image processing apparatus 10 includes a control unit 110, a storage unit 120, a communication unit 130, an operation unit 140, a display unit 150, an image reading unit 160, an image processing unit 170, and an image forming unit 180. These components are connected to one another through a bus 190.

The control unit 110 controls the components of the image processing apparatus 10. The control unit 110 may include a processor such as a central processing unit (CPU) and memories such as a read-only memory (ROM) and a random-access memory (RAM). The storage unit 120 stores various pieces of information such as data and programs. The programs include a program for achieving the functions of the image processing apparatus 10, which will be described later. The storage unit 120 may include, for example, a hard disk drive or a solid-state drive (SSD). The communication unit 130 is connected to the communication lines 40 and 50 and performs communication through the communication line 40 or 50. The communication unit 130 may be, for example, a network adapter.

The operation unit 140 receives operations performed by the user. The operation unit 140 may include, for example, operation keys and a touch panel. The display unit 150 displays various images. The display unit 150 includes, for example, a liquid crystal display. The image reading unit 160 reads an image of a document and converts the image into image data. The image reading unit 160 may include, for example, an image scanner. The image processing unit 170 performs various types of image processing such as color correction and toner correction on image data input from the communication unit 130 or the image reading unit 160. The image processing unit 170 may include, for example, a dynamically reconfigurable processor (DRP), a field-programmable gate array (FPGA), or an application-specific integrated circuit (ASIC). The image forming unit 180 forms an image according to image data subjected to image processing on a recording medium such as a sheet of paper. The image forming unit 180 may include, for example, a printer employing electrophotography.

The storage unit 120 stores basic application programs 121, derivative application programs 122, an application program management table 123, and a state control table 124. In the following description, application programs will be abbreviated as "apps".

The basic apps 121 are used to control the operation of the image processing apparatus 10. The basic apps 121 may include, for example, a print app, a copy app, a scan app, a facsimile app, an email app, and a device app. The print app, the copy app, the scan app, the facsimile app, the email app, and the device app are used to control a printing process, a copying process, a scanning process, a facsimile process, transmission and reception of emails, and management of the image processing apparatus 10, respectively. When the basic apps 121 include the scan app, for example, the display unit 150 displays a setting screen corresponding to the scan app. The setting screen is used to set conditions for the scanning process. If the user sets the conditions for the scanning process on the setting screen, the image reading unit 160 performs the scanning process in accordance with the set conditions using the scan app.

The derivative apps 122 are created by the user or a manager of the image processing apparatus 10 on the basis of the basic apps 121. The derivative apps 122 share a part of settings of the basic apps 121. If a first customized app is created from the scan app in order to perform color scanning more easily, for example, conditions for the color scanning are set in the first customized app in advance. An operation image corresponding to the first customized app is also displayed on the display unit 150. If the user presses the operation image, the image reading unit 160 performs color scanning using the first customized app. The derivative apps 122 can independently achieve the functions of the basic apps 121. Even if one of the basic apps 121 is removed or disabled, for example, a corresponding derivative app 122 can achieve at least a part of the functions of the basic app 121.

FIG. 3 is a diagram illustrating an example of the app management table 123. The app management table 123 is used to manage the derivative apps 122. The app management table 123 includes identifiers of the basic apps 121, identifiers of the derivative apps 122, work flags, cooperation uniform resource locators (URLs), and communication histories. An identifier of each basic app 121 is associated with an identifier of a derivative app 122 created from the basic app 121. The identifier of each derivative app 122 is associated with a work flag, a cooperation URL, and a communication history corresponding to the derivative app 122.

The identifiers of the basic apps 121 and the derivative apps 122 are information for uniquely identifying the basic apps 121 and the derivative apps 122. The work flags indicate whether the derivative apps 122 are used for work. Here, a work flag "true" indicates that a corresponding derivative app 122 is used for work. A work flag "false", on the other hand, indicates that a corresponding derivative app 122 is not used for work. A cooperation URL indicates a location of the external apparatus 30 with which a corresponding derivative app 122 cooperates for work. An identifier of a basic app 121, an identifier of a derivative app 122, a work flag, and a cooperation URL may be registered when the derivative app 122 is created.

A communication history is a history of communication performed with the external apparatus 30 with which a corresponding derivative app 122 cooperates for work. A location of the external apparatus 30 is indicated by a cooperation URL. A communication history includes a cooperation flag and a communication frequency. A cooperation flag indicates whether a corresponding derivative app 122 has communicated with the external apparatus 30 with which the derivative app 122 cooperates for work. A cooperation flag "true" indicates that a corresponding derivative app 122 has at least once performed communication with the external apparatus 30 with which the derivative app 122 cooperates for work. A cooperation flag "false", on the other hand, indicates that a corresponding derivative app 122 has never communicated with the external apparatus 30 with which the derivative app 122 cooperates for work. A communication frequency indicates a frequency at which a corresponding derivative app 122 has communicated with the external apparatus 30 with which the derivative app 122 cooperates for work. A communication frequency is, for example, expressed by the number of times of communication performed in a unit period, such as a day. The number of times of communication may be the number of times of communication performed in a latest unit period or an average number of times of communication performed in a predetermined period. A communication history may be updated, for example, each time a corresponding derivative app 122 has communicated with the external apparatus 30 with which the derivative app 122 cooperates for work.

FIG. 4 is a diagram illustrating an example of the state control table 124. The state control table 124 is used to control states of the basic apps 121 and the derivative apps 122. The state control table 124 includes identifiers of apps and state information. The identifier of each app is associated with state information regarding the app. An identifier of an app is information for uniquely identifying a basic app 121 or a derivative app 122. State information indicates whether a corresponding basic app 121 or derivative app 122 is available. The state information is, for example, "enabled" or "disabled". "Enabled" indicates a state in which an app may be used. That is, "enabled" indicates that an app is available. "Disabled", on the other hand, indicates a state in which use of an app is forbidden. That is, "disabled" indicates that an app is unavailable.

The state control table 124 is referred to in order to check a state of an app each time execution of the app is requested. If an app is enabled, the app is executed, and a corresponding process is performed. If an app is disabled, on the other hand, the app is not executed, and a corresponding process is not performed.

Figures 5, 6:
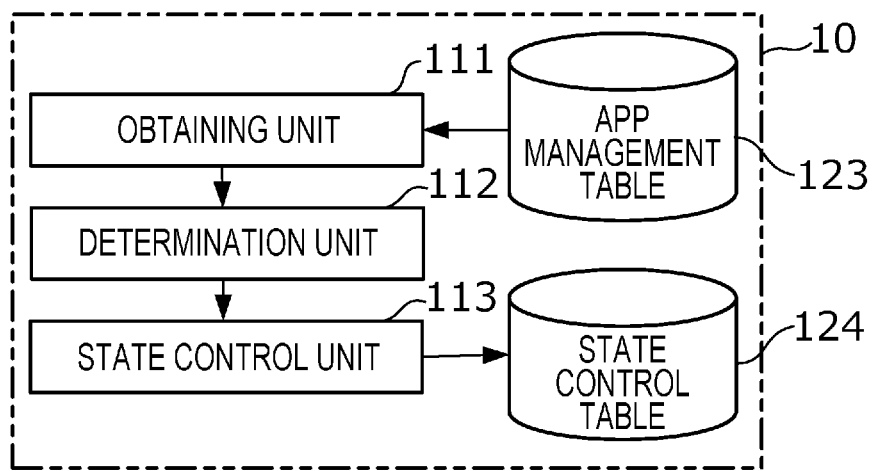
FIG. 5 is a diagram illustrating an example of the functional configuration of the image processing apparatus according to the first exemplary embodiment.
FIG. 6 is a diagram illustrating an example of a setting screen according to the first exemplary embodiment.

FIG. 5 is a diagram illustrating an example of the functional configuration of the image processing apparatus 10. The image processing apparatus 10 functions as an obtaining unit 111, a determination unit 112, and a state control unit 113. These functions are achieved when a processor that executes a program stored in a memory has performed calculation or controlled communication performed by the communication unit 130 using the program.

When a basic app 121 is to be disabled in accordance with an operation performed by the user using the terminal apparatus 20, the obtaining unit 111 obtains a request to disable the basic app 121 from the terminal apparatus 20. The obtaining unit 111 also obtains, from the app management table 123, a history of communication performed with the external apparatus 30 in accordance with a derivative app 122 (hereinafter referred to as a "target derivative app 122") created from the basic app 121. The communication history includes, for example, a communication frequency. The communication history obtained by the obtaining unit 111 is supplied to the determination unit 112.

The determination unit 112 determines whether to disable the target derivative app 122 using the communication history obtained by the obtaining unit 111. In the first exemplary embodiment, whether to disable the target derivative apps 122 is determined in accordance with the communication frequency included in the communication history. If the communication frequency is equal to or higher than a threshold, for example, it is determined that the target derivative app 122 is to remain enabled. If the communication frequency is lower than the threshold, on the other hand, it is determined that the target derivative app 122 is to be disabled. The threshold is set, for example, as a frequency indicating that the image processing apparatus 10 and the external apparatus 30 actually cooperate. A result of the determination made by the determination unit 112 is supplied to the state control unit 113.

The state control unit 113 determines, in accordance with the result of the determination made by the determination unit 112, whether to disable the target derivative app 122. If the state control unit 113 determines that the target derivative app 122 is to remain enabled, for example, the target derivative app 122 remains enabled. If the state control unit 113 determines that the target derivative app 122 is to be disabled, on the other hand, the target derivative app 122 is disabled. A state of the derivative app 122 is controlled, for example, by changing state information regarding the derivative app 122 included in the state control table 124.

1.2 Operation

The user disables a desired basic app 121. In this case, the user displays a setting screen 221 for setting a state of an app on the terminal apparatus 20 and performs an operation for disabling the desired basic app 121.

FIG. 6 is a diagram illustrating an example of the setting screen 221. The setting screen 221 includes a list of the basic apps 121 and the derivative apps 122 stored in the storage unit 120 of the image processing apparatus 10. It is assumed here that the user disables the scan app. In this case, the user performs an operation for disabling the scan app on the setting screen 221.

If the user performs an operation for disabling a basic app 121, the terminal apparatus 20 transmits a request to disable the basic app 121 to the image processing apparatus 10. The request includes an identifier of the basic app 121 to be disabled. The request to disable the scan app, for example, includes an identifier of the scan app. Upon receiving the request from the terminal apparatus 20, the image processing apparatus 10 performs the following process.

Figure 7:
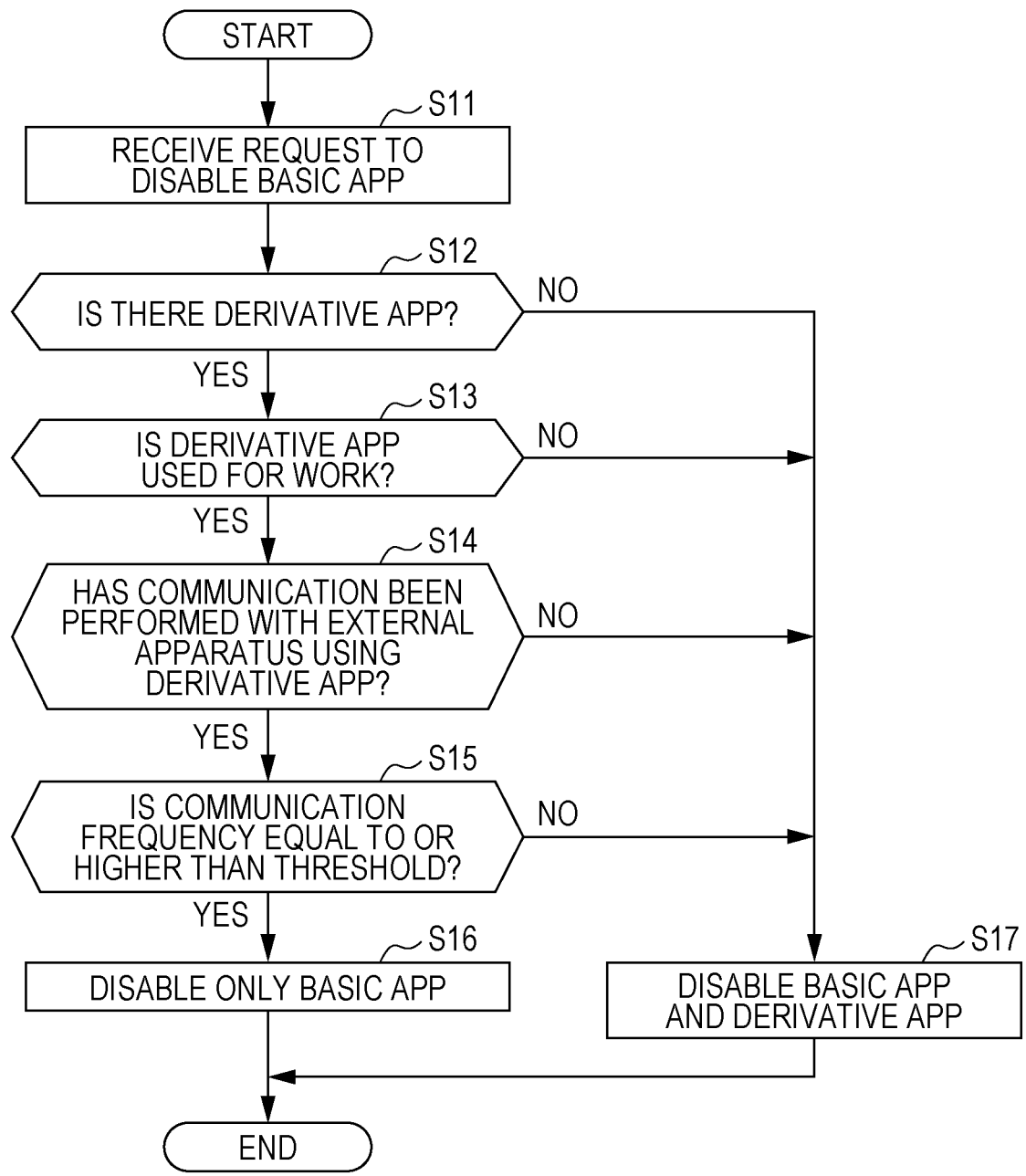
FIG. 7 is a flowchart illustrating an example of a process performed by the image processing apparatus according to the first exemplary embodiment.

FIG. 7 is a flowchart illustrating an example of the process performed by the image processing apparatus 10. In step S11, the obtaining unit 111 receives a request to disable a basic app 121 from the terminal apparatus 20. For example, a request to disable the scan app is received. The request includes the identifier of the scan app.

In step S12, the determination unit 112 refers to the app management table 123 and determines whether there is a target derivative app 122 corresponding to the basic app 121 for which the request has been received in step S11. When the identifier of the scan app and an identifier of a first customized app are associated with each other in the app management table 123 as illustrated in FIG. 3, for example, the first customized app has been created from the scan app. In this case, the first customized app is the target derivative app 122. If there is a target derivative app 122 as in this case, a result of the determination in step S12 is YES, and the process proceeds to step S13.

In step S13, the determination unit 112 refers to the app management table 123 and determines whether the target derivative app 122 is an app used for work. When a work flag associated with the identifier of the first customized app is "true" in the app management table 123 as illustrated in FIG. 3, for example, the first customized app is an app used for work. In this case, a result of the determination in step S13 is YES, and the process proceeds to step S14.

In step S14, the determination unit 112 refers to the app management table 123 and determines whether communication has been performed with the external apparatus 30 using the target derivative app 122. When a cooperation flag associated with the identifier of the first customized app is "true" in the app management table 123 as illustrated in FIG. 3, for example, communication has been at least once performed with the external apparatus 30 using the first customized app. In this case, a result of the determination in step S14 is YES, and the process proceeds to step S15.

In step S15, the determination unit 112 refers to the app management table 123 and determines whether a frequency of communication performed with the cooperating external apparatus 30 using the target derivative app 122 is equal to or higher than a threshold. It is assumed here that the threshold is five times a day. First, the obtaining unit 111 reads a communication frequency associated with the identifier of the first customized app from the app management table 123. When the communication frequency is "10 times/day" as illustrated in FIG. 3, for example, the frequency of communication performed with the external apparatus 30 using the first customized app is 10 times a day. Since the communication frequency of the target derivative app 122 is equal to or higher than the threshold in this case, a result of the determination in step S15 is YES, and the process proceeds to step S16.

In step S16, the state control unit 113 disables the basic app 121 for which the request has been received and keeps the target derivative app 122 enabled. As illustrated in FIG. 4, for example, state information regarding the scan app included in the state control table 124 is changed from "enabled" to "disabled". State information regarding the first customized app included in the state control table 124, on the other hand, remains "enabled".

If one of the results of the determinations in steps S12 to S15 is NO, on the other hand, the process proceeds to step S17. In step S17, the state control unit 113 disables both the basic app 121 for which the request has been received and the target derivative app 122. For example, both the state information regarding the scan app and the state information regarding the first customized app included in the state control table 124 are changed from "enabled" to "disabled".

In the above-described first exemplary embodiment, the image processing apparatus 10 is used as a management apparatus in the present disclosure.

According to the first exemplary embodiment described above, when a basic app 121 is disabled, a target derivative app 122 remains enabled if communication has been performed with the external apparatus 30 using the target derivative app 122 at a frequency equal to or higher than a threshold. In this case, the target derivative app 122 is prevented from becoming unavailable when the basic app 121 is disabled. As a result, a process performed in relation to communication performed with the external apparatus 30 using the target derivative app 122 is not hampered. If the frequency at which communication has been performed with the external apparatus 30 using the target derivative app 122 is lower than the threshold, on the other hand, the target derivative app 122 is also disabled. In this case, when the basic app 121 is disabled, the target derivative app 122 can also be disabled without an operation performed by the user.

2. Second Exemplary Embodiment

In the second exemplary embodiment, the user may temporarily disable a desired basic app 121. The temporary disablement refers to disabling of a basic app 121 for a certain period of time, such as a week or a month. In this case, whether to disable a target derivative app 122 is controlled in accordance with the length of the period (hereinafter referred to as a "disablement period") for which a basic app 121 remains disabled as well as presence or absence of communication with the external apparatus 30. In the following description, description of the same elements as in the first exemplary embodiment is omitted.

If a basic app 121 is disabled, the obtaining unit 111 obtains the length of a disablement period of the basic app 121 from the terminal apparatus 20. The determination unit 112 determines whether to disable a target derivative app 122 using a communication history and the length of the disablement period obtained by the obtaining unit 111. The communication history includes a cooperation flag but need not include a communication frequency, for example, in the second exemplary embodiment. If the communication history indicates that communication has been performed with the external apparatus 30 and the disablement period is equal to or shorter than a threshold, for example, the determination unit 112 determines that the target derivative app 122 is to remain enabled. If the disablement period is longer than the threshold, on the other hand, the determination unit 112 determines that the target derivative app 122 is to be disabled. The threshold is predetermined to a period of time indicating, for example, that a basic app 121 is temporarily disabled.

When the user temporarily disables a desired basic app 121, the user performs an operation for selecting temporary disablement during an operation for disabling a desired basic app 121 performed on a setting screen 221. When the operation for temporarily disabling a basic app 121 has been performed, the terminal apparatus 20 transmits a request to disable the basic app 121 to the image processing apparatus 10. The request includes the length of a disablement period as well as an identifier of the basic app 121 to be disabled. When the basic app 121 is to be disabled for a week, for example, the length of the disablement period is a week.

Figure 8:
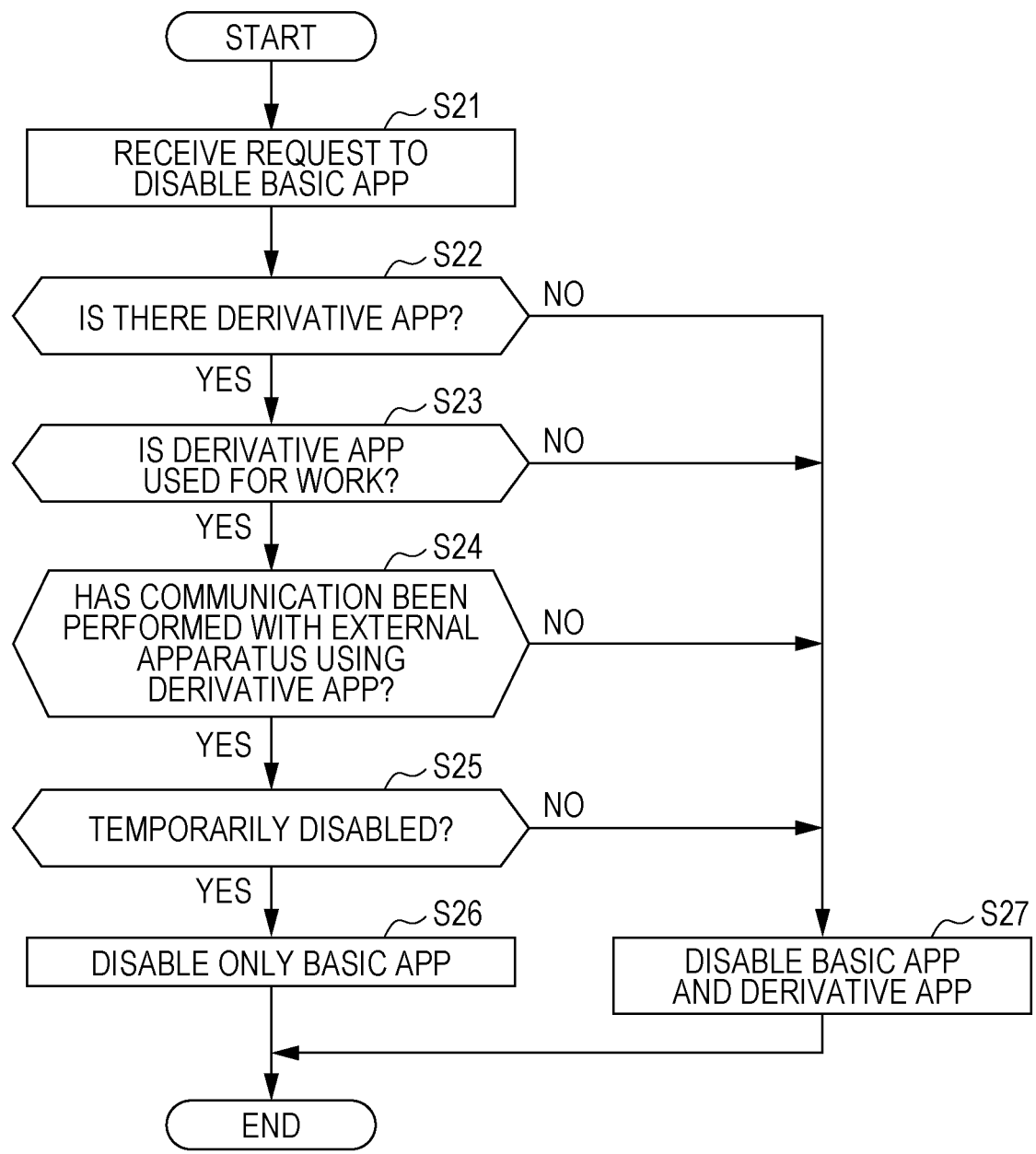
FIG. 8 is a flowchart illustrating an example of a process performed by an image processing apparatus according to a second exemplary embodiment.

FIG. 8 is a flowchart illustrating an example of a process performed by the image processing apparatus 10 according to the second exemplary embodiment. Steps S21 to S24 are basically the same as steps S11 to S14, respectively, described above. In step S21, however, a request including an identifier of a basic app 121 to be disabled and the length of a disablement period is received.

In step S25, the determination unit 112 determines whether the basic app 121 for which the request has been received is to be temporarily disabled. Whether the basic app 121 is to be temporarily disabled is determined on the basis of whether the disablement period of the basic app 121 is equal to or shorter than a threshold. It is assumed here that the threshold is a week. If the length of the disablement period included in the request received in step S21 is a week, for example, the basic app 121 for which the request has been received is to be temporarily disabled. In this case, a result of the determination in step S25 is YES, and the process proceeds to step S26. Step S26 is the same as step S16 described above.

If at least one of the results of the determinations in steps S22 to S25 is NO, on the other hand, the process proceeds to step S27. Step S27 is the same as step S17 described above.

According to the above-described second exemplary embodiment, when a basic app 121 is temporarily disabled, a target derivative app 122 remains enabled. As a result, the target derivative app 122 can be prevented from becoming unavailable as the basic app 121 is temporarily disabled. If a basic app 121 is disabled for a period of time longer than the threshold, on the other hand, a target derivative app 122 is also disabled. In this case, therefore, when a basic app 121 is disabled, a target derivative app 122 can be disabled without an operation performed by a person.

3. Third Exemplary Embodiment

In a third exemplary embodiment, the user may disable a basic app 121 that does not satisfy a security condition relating to encryption of communication. The security condition is predetermined, for example, as a condition indicating an information security level for securing safety. In this case, whether to disable a target derivative app 122 is controlled in accordance with whether attribute information regarding encryption of communication performed using the target derivative app 122 satisfies the security condition as well as presence or absence of communication with the external apparatus 30. In the following description, description of the same elements as in the first exemplary embodiment is omitted.

When a basic app 121 is to be disabled, the obtaining unit 111 obtains, from the terminal apparatus 20, a reason (hereinafter referred to as a "disablement reason") for disabling the basic app 121. The obtaining unit 111 also obtains the attribute information regarding the encryption of the communication performed using the target derivative app 122. The attribute information includes, for example, information indicating an attribute of an electronic certificate used for the encryption.

The determination unit 112 determines, using a communication history and the disablement reason obtained by the obtaining unit 111, whether to disable the target derivative app 122. The communication history may include a cooperation flag but need not include a communication frequency, for example, in the third exemplary embodiment. If the communication history indicates that communication has been performed with the external apparatus 30 and the attribute information obtained by the obtaining unit 111 satisfies the security condition, for example, the determination unit 112 determines that the target derivative app 122 is to remain enabled. If the attribute information obtained by the obtaining unit 111 does not satisfy the security condition, on the other hand, the determination unit 112 determines that the target derivative app 122 is to be disabled.

When a basic app 121 that does not satisfy the security condition relating to the encryption of communication is to be disabled, the user inputs a reason for the disablement when performing an operation for disabling the basic app 121 on the setting screen 221. It is assumed here that the basic app 121 is an email app and the security condition is that a key of an electronic certificate used to encrypt an email be equal to or longer than 2,048 bits. If a key of an electronic certificate used by an email app to encrypt an email is 1,024 bits and the email app is to be disabled since the key length of the electronic certificate does not satisfy the security condition, the security condition not being satisfied is input as the disablement reason.

When the operation for disabling the basic app 121 has been performed, the terminal apparatus 20 transmits a request to disable the basic app 121 to the image processing apparatus 10. The request includes the disablement reason as well as an identifier of the basic app 121 to be disabled. The disablement reason is a reason why the basic app 121 has been disabled. If the email app is to be disabled because the key length of an electronic certificate used by the email app to encrypt an email does not satisfy the security condition, for example, the security condition not being satisfied is the disablement reason. In this case, the disablement reason includes the security condition.

Figure 9:
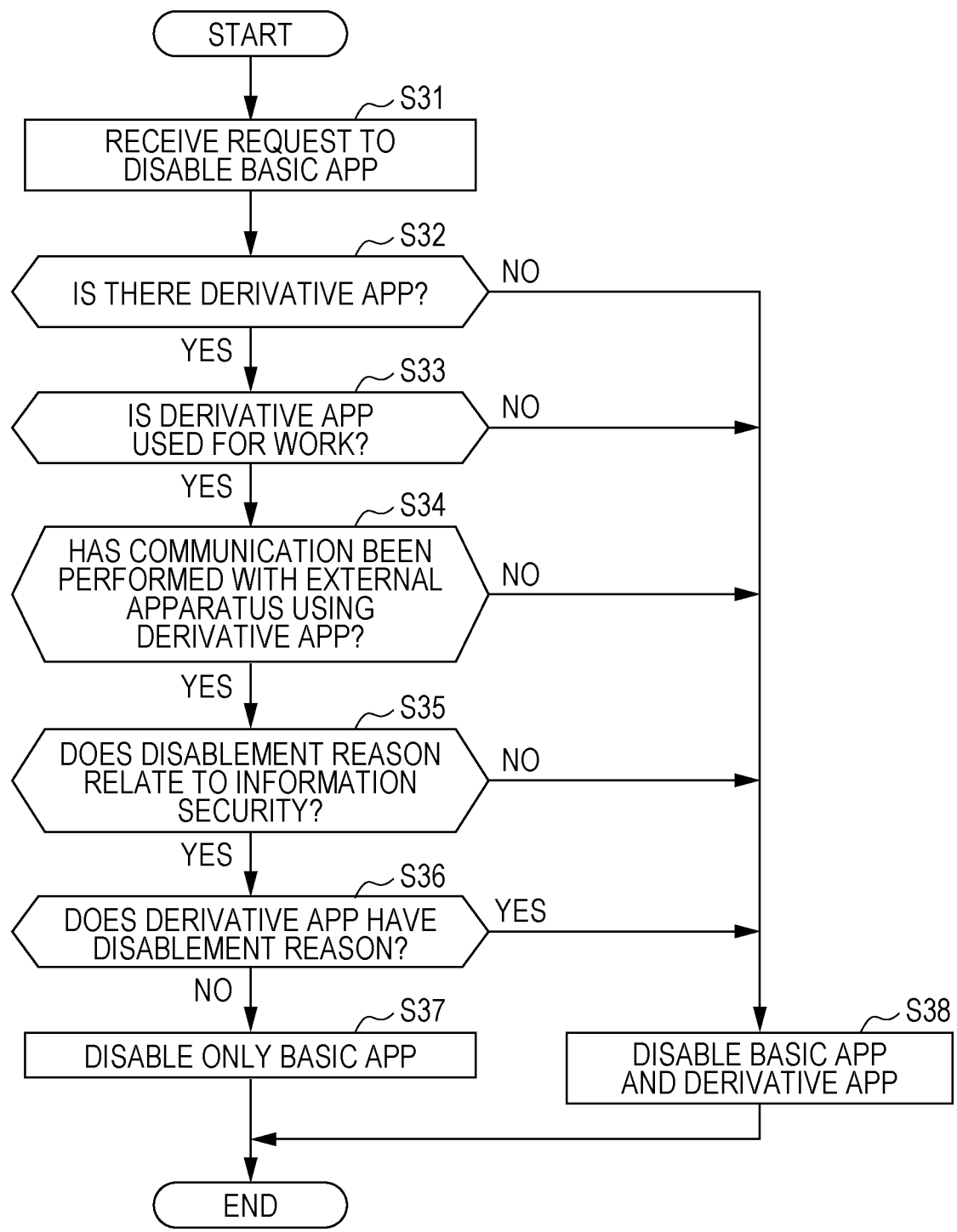
FIG. 9 is a flowchart illustrating an example of a process performed by an image processing apparatus according to a third exemplary embodiment.

FIG. 9 is a flowchart illustrating an example of a process performed by the image processing apparatus 10 according to the third exemplary embodiment. Steps S31 to S34 are basically the same as steps S11 to S14, respectively, described above. In step S31, however, a disablement request including an identifier of a basic app 121 to be disabled and a disablement reason is received.

In step S35, the determination unit 112 determines whether the disablement reason of the basic app 121 to be disabled relates to information security. If the disablement reason included in the disablement request received in step S31 is the security condition not being satisfied, for example, the disablement reason of the basic app 121 relates to information security. In this case, a result of the determination in step S35 is YES, and the process proceeds to step S36.

In step S36, the determination unit 112 determines whether a target derivative app 122 has a disablement reason. It is assumed here that a second customized app has been created from an email app. In this case, the second customized app is the target derivative app 122. First, the obtaining unit 111 obtains the key length of an electronic certificate used by the second customized app to encrypt an email. If the key length of the electronic certificate is 2,048 bits, for example, the security condition is satisfied, and the second customized app does not have a disablement reason. In this case, a result of the determination in step S36 is NO, and the process proceeds to step S37. Step S37 is the same as step S16 described above.

If at least one of the results of the determinations in step S32 to S35 is NO or if the result of the determination in step S36 is YES, on the other hand, the process proceeds to step S38. Step S38 is the same as step S17 described above.

According to the above-described third exemplary embodiment, whether to disable a target derivative app 122 can be controlled in consideration of a reason for disabling a basic app 121. In addition, if attribute information regarding encryption of communication performed using the target derivative app 122 satisfies the security condition, the target derivative app 122 is to remain enabled. In this case, therefore, the target derivative app 122 can be prevented from becoming unavailable as the basic app 121 is disabled. If the attribute information regarding the encryption of the communication performed using the target derivative app 122 does not satisfy the security condition, on the other hand, the target derivative app 122 is also disabled as the basic app 121 is disabled. In this case, when the basic app 121 is disabled, the target derivative app 122 can also be disabled without an operation performed by a person.

4. Fourth Exemplary Embodiment

In a fourth exemplary embodiment, apps may be enabled or disabled in units of functions achieved by the apps. For example, the user may disable only a part of functions (hereinafter referred to as a "target function") achieved by a basic app 121. In this case, whether to disable a target function achieved by a target derivative app 122 is controlled. Whether to disable the target function achieved by the target derivative app 122 is controlled in accordance with the amount of use of the target function achieved by the target derivative app 122 as well as presence or absence of communication with the external apparatus 30. In the following description, description of the same elements as in the first exemplary embodiment is omitted.

In the fourth exemplary embodiment, an app management table 125 and a state control table 126 are stored instead of the app management table 123 and the state control table 124 according to the first exemplary embodiment.

FIG. 10 is a diagram illustrating an example of the app management table 125 according to the fourth exemplary embodiment. The app management table 125 includes identifiers of functions and use frequencies as well as, as with the app management table 123 according to the first exemplary embodiment, the identifiers of the basic apps 121, the identifiers of the derivative apps 122, the work flags, the cooperation URLs, and the cooperation flags. The identifiers of the derivative apps 122 are each associated with identifiers of functions achieved by the derivative app 122 and use frequencies of the functions. The identifiers of functions are information for uniquely identifying the functions achieved by the derivative apps 122. The use frequencies indicate frequencies at which the functions achieved by the derivative apps 122 have been used. The use frequencies are each indicated by the number of times of use in a unit period such as a day. The number of times of use may be the number of times of use in a latest unit period or an average number of times of use in a predetermined period.

FIG. 11 is a diagram illustrating an example of the state control table 126 according to the fourth exemplary embodiment. The state control table 126 includes identifiers of functions as well as, as with the state control table 124, the identifiers of the apps and the state information. The identifiers of the apps are each associated with the identifiers of the functions achieved by the app and the state information regarding the functions. The identifiers of functions are information for identifying the functions achieved by the apps. The state information indicates whether the functions achieved by the apps are available. The state information includes "enabled" and "disabled", for example, as in the state control table 124.

The state control table 126 is referred to in order to check a state of a function achieved by an app each time execution of the function is requested. As a result, if the function is enabled, the app is executed, and the function is achieved. If the function is disabled, the app is not executed, and the function is not achieved.

When a part of functions of a basic app 121 is to be disabled, the obtaining unit 111 obtains a use frequency of a target function achieved by a target derivative app 122 from the app management table 125. The determination unit 112 determines, using a communication history and the use frequency obtained by the obtaining unit 111, whether to disable the target function achieved by the target derivative app 122. The communication history may include a cooperation flag but need not include a communication frequency, for example, in the fourth exemplary embodiment. If the communication history indicates that communication has been performed with the external apparatus 30 and the use frequency obtained by the obtaining unit 111 is equal to or higher than a threshold, for example, the determination unit 112 determines that the target function achieved by the target derivative app 122 is to remain enabled. If the use frequency obtained by the obtaining unit 111 is lower than the threshold, on the other hand, the determination unit 112 determines that the target function achieved by the target derivative app 122 is to be disabled. The threshold is predetermined to a frequency indicating, for example, that the target function is actually used for work. The state control unit 113 controls, in accordance with a result of the determination made by the determination unit 112, whether to disable the target function achieved by the target derivative app 122.

When a part of functions achieved by a basic app 121 is to be disabled, the user selects a target function on the setting screen 221 and performs an operation for disabling the selected target function. It is assumed here that the basic app 121 is a scan app and the target function is color scanning. When an operation for disabling the target function of the basic app 121 has been performed, the terminal apparatus 20 transmits a request to disable the basic app 121 to the image processing apparatus 10. The request includes an identifier of the target function as well as an identifier of the basic app 121 to be disabled.

Figure 12:
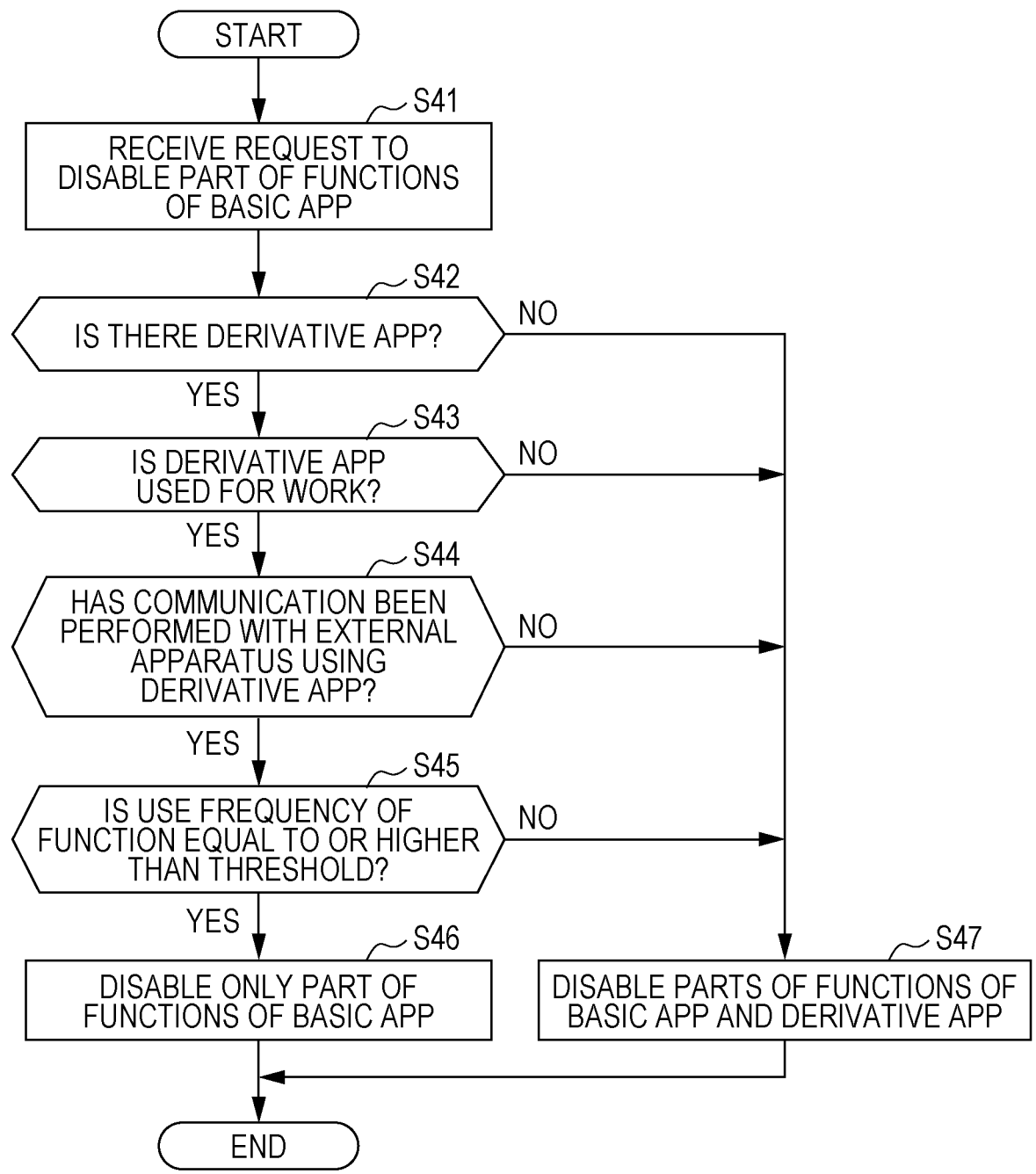
FIG. 12 is a flowchart illustrating an example of a process performed by an image processing apparatus according to the fourth exemplary embodiment.

FIG. 12 is a flowchart illustrating an example of a process performed by the image processing apparatus 10 according to the fourth exemplary embodiment. Steps S41 to S44 are basically the same as steps S11 to S14, respectively, described above. In step S41, however, a request including an identifier of a basic app 121 to be disabled and an identifier of a target function are received.

In step S45, the determination unit 112 determines whether a use frequency of a target function achieved by a target derivative app 122 is equal to or higher than a threshold. It is assumed here that the threshold is twice a day. First, the obtaining unit 111 reads a use frequency associated with an identifier of a first customized app and an identifier of color scanning from the app management table 125. When the use frequency is "5 times/day" as illustrated in FIG. 10, for example, a use frequency of color scanning achieved by the first customized app is five times a day. In this case, the use frequency of the target function achieved by the target derivative app 122 is equal to or higher than the threshold, and a result of the determination in step S45 is YES, and the process proceeds to step S46.

In step S46, the state control unit 113 disables the target function achieved by the basic app 121 for which the request has been received and keeps the target function achieved by the target derivative app 122 enabled. As illustrated in FIG. 11, for example, state information regarding color scanning of the scan app included in the state control table 126 is changed to "disabled". State information regarding color scanning achieved by the first customized app remains as "enabled".

If one of the results of the determinations in step S42 to S45 is NO, on the other hand, the process proceeds to step S47. In step S47, the state control unit 113 disables both the target function achieved by the basic app 121 for which the request has been received and the target function achieved by the target derivative app 122. For example, both the state information regarding color scanning achieved by the scan app and the state information regarding color scanning achieved by the first customized app included in the state control table 126 are changed to "disabled".

According to the fourth exemplary embodiment described above, whether to disable a target derivative app 122 can be controlled in units of functions to be disabled in a basic app 121. If a use frequency of a target function achieved by a target derivative app 122 is equal to or higher than a threshold, the target function achieved by the target derivative app 122 remains enabled. In this case, therefore, the target function achieved by the target derivative app 122 can be prevented from becoming unavailable as a part of the functions of the basic app 121 is disabled. If the use frequency of the target function achieved by the target derivative app 122 is lower than the threshold, on the other hand, the target function achieved by the target derivative app 122 is also disabled. In this case, therefore, when the part of the functions of the basic app 121 is disabled, the target function achieved by the target derivative app 122 can also be disabled without an operation performed by a person.

5. Fifth Exemplary Embodiment

In the fifth exemplary embodiment, a use period of an app may be restricted. In other words, a basic app 121 may be enabled for a certain period of time and disabled for the rest of time, that is, a basic app 121 may be enabled or disabled in units of time. For example, the user may restrict a use period of a basic app 121. In this case, a use period of a target derivative app 122 is restricted in accordance with the use period of the target derivative app 122 as well as presence or absence of communication with the external apparatus 30. In the following description, description of the same elements in the first exemplary embodiment is omitted.

In the fifth exemplary embodiment, the storage unit 120 stores an app management table 127 and a state control table 128 instead of the app management table 123 and the state control table 124 according to the first exemplary embodiment.

FIG. 13 is a diagram illustrating an example of the app management table 127 according to the fifth exemplary embodiment. The app management table 127 includes use periods as well as, as with the app management table 123, the identifiers of the basic apps 121, the identifiers of the derivative apps 122, the work flags, the cooperation URLs, and the cooperation flags. The identifiers of the derivative apps 122 are each associated with a use period of the derivative app 122. A use period is indicated, for example, by a period of time between a time point at which a derivative app 122 was used for a first time in a unit period such as a day and a time point at which the derivative app 122 was used for a last time. The time point at which a derivative app 122 was used for the first time may be an earliest one of time points at which the derivative app 122 was used for the first time in a plurality of unit periods. The time point at which a derivative app 122 was used for the last time may be a latest one of time points at which the derivative app 122 was used for the last time in a plurality of unit periods. If an earliest one of time points at which a derivative app 122 was used for the first time so far is 9 a.m. and a latest one of time points at which the derivative app 122 was used for the last time so far is 8 p.m., for example, a use period of the derivative app 122 is 9 a.m. to 8 p.m.

FIG. 14 is a diagram illustrating an example of the state control table 128 according to the fifth exemplary embodiment. The state control table 128 includes available periods as well as, as with the state control table 124, the identifiers of the apps. The identifiers of the apps are each associated with an available period of the app. An available period refers to a period of time in which an app can be used. If an available period of an app is restricted to a certain period of time, for example, the certain period of time is the available period. The rest of time is an unavailable period, in which the app is unavailable. An available period of "9 a.m. to 5 p.m.", for example, indicates that a use period of an app is restricted to 9 a.m. to 5 p.m. In this case, the app is available from 9 a.m. to 5 p.m. but unavailable from 5 p.m. to 9 a.m. next day. An available period of "always", for example, indicates that a use period of an app is not restricted. In this case, the app can be used at any time.

When a use period of a basic app 121 is to be restricted, the obtaining unit 111 obtains a use period of a target derivative app 122 from the app management table 127. The determination unit 112 controls whether to restrict the use period of the target derivative app 122 using a communication history and the use period obtained by the obtaining unit 111. The communication history may include a cooperation flag but need not include a communication frequency, for example, in the fifth exemplary embodiment. If the communication history indicates that communication has been performed with the external apparatus 30 and the use period obtained by the obtaining unit 111 overlaps an unavailable period of the basic app 121, for example, the determination unit 112 determines that the use period of the target derivative app 122 is to remain the same. If the use period obtained by the obtaining unit 111 does not overlap the unavailable period of the basic app 121, on the other hand, the determination unit 112 determines that the use period of the target derivative app 122 is to be disabled.

The state control unit 113 controls, in accordance with a result of the determination made by the determination unit 112, whether to restrict the use period of the target derivative app 122. If the determination unit 112 determines that the restriction of the use period of the target derivative app 122 is to remain the same, for example, the restriction of the use period of the target derivative app 122 remains the same. In other words, a current available period of the target derivative app 122 does not change, that is, the target derivative app 122 is enabled during the current available period and disabled during a current unavailable period. If the use period of the target derivative app 122 is not currently restricted, for example, the use period of the target derivative app 122 remains unrestricted. If the use period of the target derivative app 122 is currently restricted to a certain period of time, on the other hand, the use period of the target derivative app 122 remains restricted to the certain period of time. If the determination unit 112 determines that the use period of the target derivative app 122 is to be disabled, on the other hand, the use period of the target derivative app 122 is further restricted. The use period of the derivative app 122 is restricted, for example, by changing the available period of the derivative app 122 included in the state control table 128.

When the use period of a basic app 121 is to be disabled, the user selects an available period of the basic app 121 on the setting screen 221, for example, and performs an operation for restricting the use period of the basic app 121. The available period refers to a period of time for which use of the basic app 121 is permitted. The rest of time is an unavailable period, in which use of the basic app 121 is forbidden. It is assumed here that the basic app 121 is a scan app and an available period is 9 a.m. to 5 p.m. In this case, an unavailable period is 5 p.m. to 9 a.m. next day, in which the basic app 121 is unavailable. If the user performs the operation for restricting the use period of the basic app 121, the terminal apparatus 20 transmits a request to restrict the use period of the basic app 121 to the image processing apparatus 10. The request includes restricted time as well as an identifier of the basic app 121 to be disabled. The restricted time may be an available period or an unavailable period.

Figure 15:
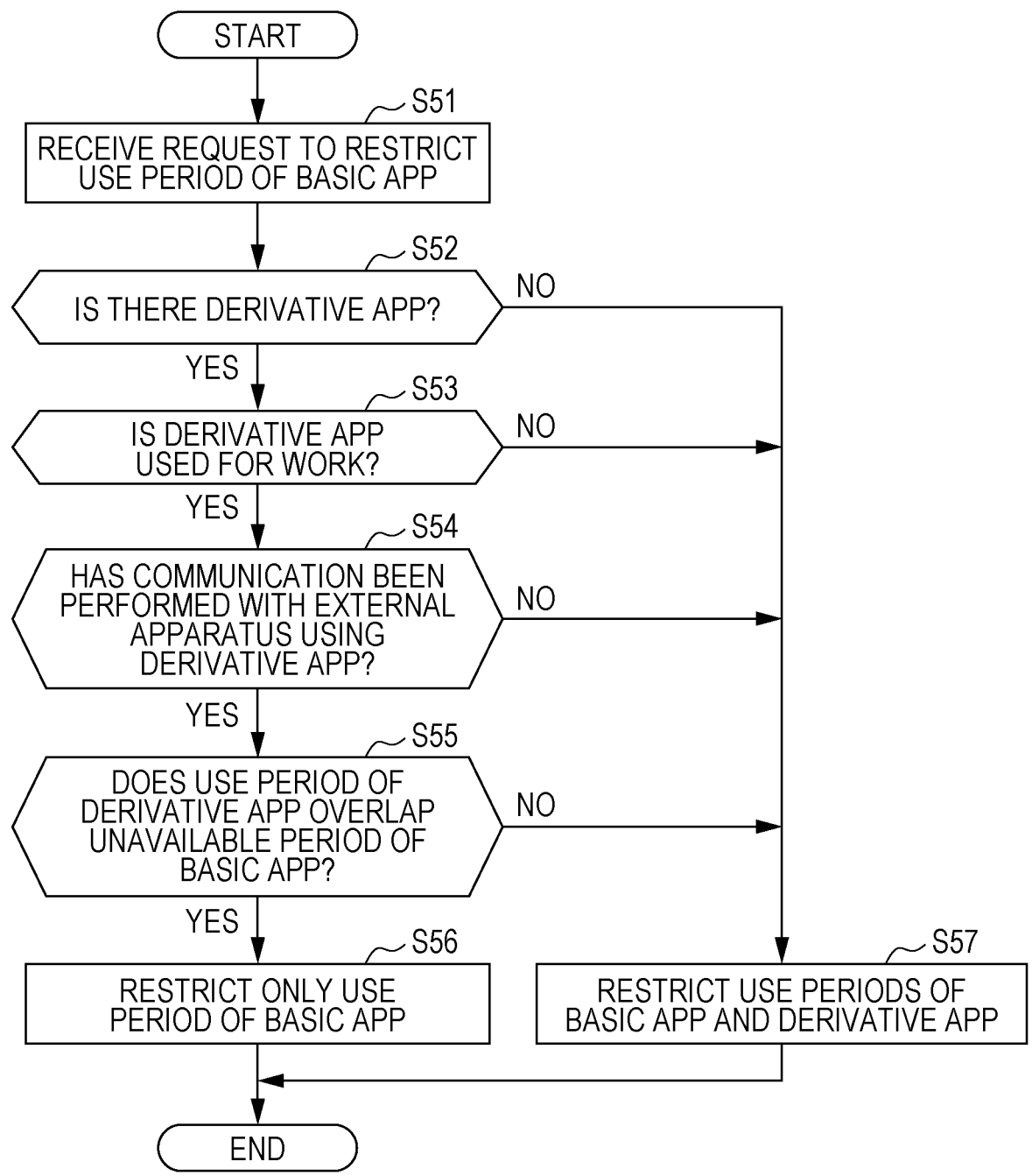
FIG. 15 is a flowchart illustrating an example of a process performed by an image processing apparatus according to the fifth exemplary embodiment.

FIG. 15 is a flowchart illustrating an example of a process performed by the image processing apparatus 10 according to the fifth exemplary embodiment. Steps S51 to S54 are basically the same as steps S11 to S14, respectively, described above. In step S51, however, a request including an identifier of a basic app 121 to be disabled and restricted time.

In step S55, the determination unit 112 determines whether a use period of a target derivative app 122 overlaps an unavailable period of the basic app 121 to be disabled. It is assumed here that the unavailable period of the basic app 121 is 5 p.m. to 9 a.m. next day. First, the obtaining unit 111 reads a use period associated with an identifier of a first customized app from the app management table 127. When the use period is "9 a.m. to 8 p.m." as illustrated in FIG. 13, for example, the use period of the first customized app is 9 a.m. to 8 p.m. In this case, since a period of time of 5 p.m. to 8 p.m., which is a part of the use period of the first customized app, overlaps the unavailable period of the basic app 121 to be disabled, a result of the determination in step S55 is YES, and the process proceeds to step S56.

In step S56, the state control unit 113 restricts a use period of the basic app 121 for which the request has been received and keeps the use period of the target derivative app 122 the same. As illustrated in FIG. 14, for example, the available period of the scan app included in the state control table 128 is changed to "9 a.m. to 5 p.m." The available period of the first customized app remains as "always".

If at least one of the results of the determinations in steps S52 to S55 described above is NO, on the other hand, the process proceeds to step S57. In step S57, the state control unit 113 restricts the use periods of both the basic app 121 for which the request has been received and the target derivative app 122. The available period of the scan app and the available period of the first customized app included in the state control table 128 are both changed, for example, to "9 a.m. to 5 a.m."

According to the above-described fifth exemplary embodiment, whether to disable a target derivative app 122 can be controlled in units of time for which a basic app 121 is disabled. If an unavailable period of a basic app 121 and a use period of a target derivative app 122 overlap, that is, if the target derivative app 122 is used in at least a part of the unavailable period of the basic app 121, the target derivative app 122 remains enabled. In this case, therefore, the target derivative app 122 can be prevented from becoming unavailable in the unavailable period of the basic app 121 as a use period of the basic app 121 is restricted. If the unavailable period of the basic app 121 and the use period of the target derivative app 122 do not overlap, that is, if the target derivative app 122 is not used in the unavailable period of the basic app 121, on the other hand, the target derivative app 122 is disabled. In this case, therefore, when the use period of the basic app 121 is restricted, the use period of the target derivative app 122 can also be restricted as with the basic app 121 without an operation performed by a person.

6. Modifications

The above-described exemplary embodiments are examples of the present disclosure. The present disclosure is not limited to the exemplary embodiments. For example, two or more of the exemplary embodiments may be combined together to implement the present disclosure. Alternatively, the exemplary embodiments may be modified as in the following examples. At this time, two or more of the following modifications may be combined together.

In each of the above-described exemplary embodiments, a person who has created a target derivative app 122 may control whether to disable the target derivative app 122. If the person is a particular person such as a person belonging to a system development department, for example, the target derivative app 122 may remain enabled when a basic app 121 is disabled. If the person who has created the target derivative app 122 is not a particular person, the target derivative app 122 may be disabled as the basic app 121 is disabled.

In each of the above-described exemplary embodiments, whether to disable a target derivative app 122 may be controlled in accordance with the number of users of the target derivative app 122. If the number of users is equal to or larger than a threshold, for example, the target derivative app 122 may remain enabled when a basic app 121 is disabled. If the number of users is smaller than the threshold, on the other hand, the target derivative app 122 may be disabled as the basic app 121 is disabled.

In the third exemplary embodiment, the attribute information relating to encryption of communication is not limited to the key length of an electronic certificate. For example, the attribute information relating to encryption of communication may be a method for encrypting an electronic certificate, a type of communication protocol, or a version of a communication protocol, instead. The method for encrypting an electronic certificate may be, for example, Rivest-Shamir-Adleman (RSA) cryptography or elliptic curve cryptography. It is assumed here, for example, that the security condition is that the method for encrypting an electronic certificate used to encrypt an email be elliptic curve cryptography, and a basic app 121 is disabled because the basic app 121 does not satisfy the security condition. In this case, if a method for encrypting an electronic certificate used by a target derivative app 122 to encrypt an email is elliptic curve cryptography, the target derivative app 122 satisfies the security condition. The target derivative app 122 may therefore remain enabled when the basic app 121 is disabled. If the method for encrypting an electronic certificate used by the target derivative app 122 to encrypt an email is RSA cryptography, on the other hand, the target derivative app 122 does not satisfy the security condition. The target derivative app 122 may therefore be disabled as the basic app 121 is disabled. The attribute information regarding encryption of communication may include a type of communication protocol or a version of a communication protocol.

In the third exemplary embodiment, the reason for disabling a basic app 121 is not limited to a reason relating to information security. For example, the reason for disabling a basic app 121 may be that the basic app 121 has not been used. In this case, when a basic app 121 has not been used, the basic app 121 can be disabled. If a target derivative app 122 has been used, for example, there is no reason to disable the target derivative app 122, and the target derivative app 122 may remain enabled.

In the fifth exemplary embodiment, a use period of a derivative app 122 may include an estimated period of time for which the derivative app 122 is to be used in the future. The estimated period of time for which the derivative app 122 is to be used in the future may be input, for example, through an operation performed by the user.

Figure 16:
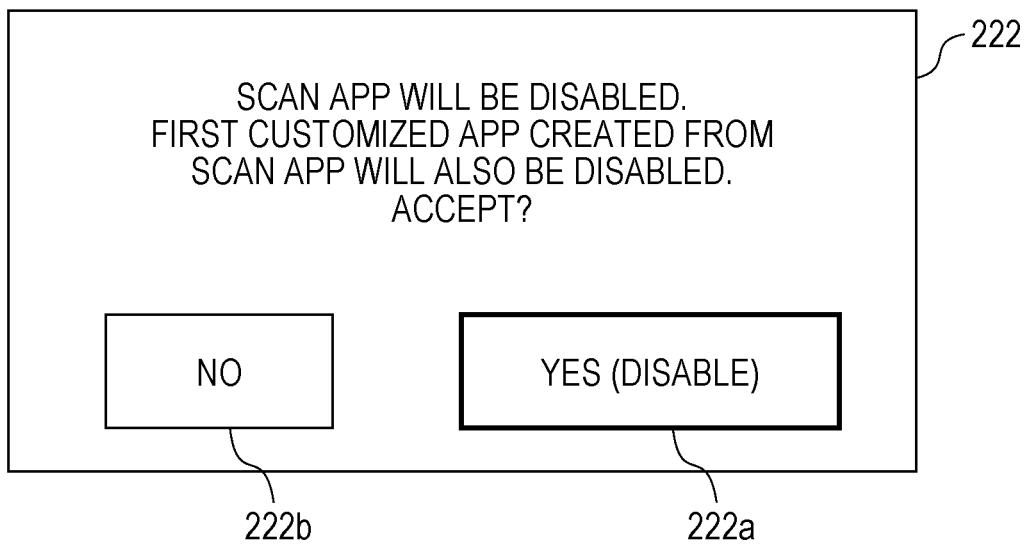
FIG. 16 is a diagram illustrating an example of a warning screen according to a modification.

In each of the above-described exemplary embodiments, the user may be warned before an app is disabled. When both a basic app 121 and a target derivative app 122 are to be disabled, for example, a warning screen 222 illustrated in FIG. 16 may be displayed on the terminal apparatus 20. The warning screen 222 includes a message for warning the user that the basic app 121 (the scan app in the example illustrated in FIG. 16) and the target derivative app 122 (the first customized app in the example illustrated in FIG. 16) will be disabled. The warning screen 222 may also include an operation button 222a for permitting the disablement of these apps and an operation button 222b for refusing the disablement. In this case, the state control unit 113 may control whether to disable the target derivative app 122 in accordance with an operation performed on the operation button 222a or 222b. If the user presses the operation button 222a, for example, the target derivative app 122 may be disabled as the basic app 121 is disabled. If the user presses the operation button 222b, on the other hand, the target derivative app 122 may remain enabled when the basic app 121 is disabled.

Figure 17:
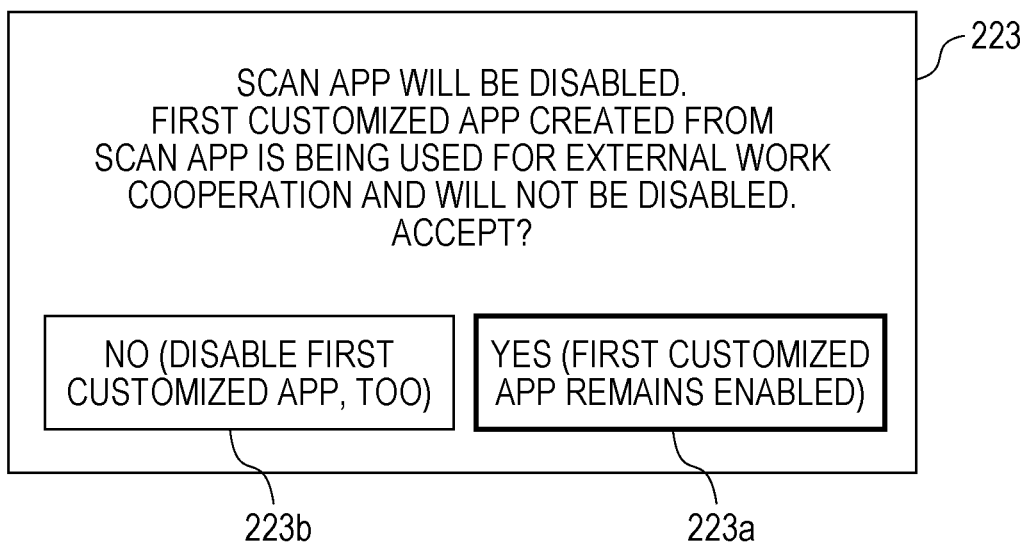
FIG. 17 is a diagram illustrating an example of a warning screen according to the modification.

When a basic app 121 is to be disabled but a target derivative app 122 is to remain enabled, a warning screen 223 illustrated in FIG. 17 may be displayed on the terminal apparatus 20. The warning screen 223 includes a message for warning the user that the basic app 121 (the scan app in the example illustrated in FIG. 17) will be disabled but the target derivative app 122 (the first customized app in the example illustrated in FIG. 17) will not be disabled. The warning screen 223 may also include an operation button 223a for permitting the disablement of the basic app 121 and the non-disablement of the target derivative app 122 and an operation button 223b for refusing the disablement and the non-disablement. The state control unit 113 may control whether to disable the target derivative app 122 in accordance with an operation performed on the operation button 223a or 223b. If the user presses the operation button 223a, for example, the target derivative app 122 may remain enabled when the basic app 121 is disabled. If the user presses the operation button 223b, on the other hand, the target derivative app 122 may be disabled as the basic app 121 is disabled.

In each of the above-described exemplary embodiments, when a target derivative app 122 remains enabled, the target derivative app 122 need not necessarily remain continuously enabled. The derivative app 122 may be disabled, for example, when a predetermined period of time has elapsed, instead.

In the fifth exemplary embodiment, a use period of a target derivative app 122 may be restricted such that the use period becomes shorter than a current available period of the target derivative app 122 and the available period of the target derivative app 122 becomes longer than an available period of a basic app 121, instead of keeping the available period of the target derivative app 122 the same. In this case, the target derivative app 122 can be used in a part of an unavailable period of the basic app 121. If a use period of the basic app 121 is restricted to 9 a.m. to 5 p.m., for example, the use period of the target derivative app 122 may be restricted to 9 a.m. to 8 p.m. In this case, the available period of the target derivative app 122 after the use period is restricted may be determined in accordance with the use period of the target derivative app 122.

In each of the above-described exemplary embodiments, the entirety of a communication history of a derivative app 122 for work may be used for the determination made by the determination unit 112, or only ca part of the communication history whose destinations, users, or communication periods satisfy a predetermination condition may be used, instead. For example, only a history of communication operations whose destinations are external apparatuses 30 indicated by cooperation URLs included in the app management table 123, 125, or 127 may be used among communication operations performed using the derivative app 122 for work. Alternatively, only a history of communication operations whose users are particular persons such as persons registered to the image processing apparatus 10 in advance may be used among communication operations performed using the derivative app 122 for work. Furthermore, only a history of communication operations whose communication periods fall within a predetermined period of time such as work time may be used among communication operations performed using the derivative app 122 for work.

In each of the above-described exemplary embodiments, the thresholds may vary depending on the importance of work. If the importance of work is high in the first exemplary embodiment, for example, the threshold for communication frequency may be changed from 10 times a day to once a day.

In the first exemplary embodiment, a history of communication performed with the external apparatus 30 in accordance with a target derivative app 122 is not limited to a cooperation flag and a communication frequency. The communication history may also include the number of times of communication. The number of times of communication may be, for example, a total number of times of communication performed so far.

In the fifth exemplary embodiment, the amount of use of a target function is not limited to a use frequency. The amount of use may include the number of times of use or a use period, instead.

In the fifth exemplary embodiment, the amount of use of a target derivative app 122 need not necessarily be used to determine whether to disable the target derivative app 122. If communication is being performed with the external apparatus 30 using the target derivative app 122, for example, the target derivative app 122 may remain enabled regardless of the amount of use of the target derivative app 122.

In each of the above-described exemplary embodiments, the basic app 121 and the derivative app 122 are not limited to above-described examples. For example, the basic app 121 may be a device app, instead. The derivative app 122 created on the basis of the device app may be a customized app for transmitting information regarding consumables of the image processing apparatus 10 to the outside, instead. That is, the basic app 121 may be any type of app installed on the image processing apparatus 10. The derivative app 122 may be any type of app created on the basis of the basic app 121.

In each of the above-described exemplary embodiments, the basic app 121 and the derivative app 122 need not necessarily be disabled in order to be regarded as unavailable. For example, the basic app 121 and the derivative app 122 may be regarded as unavailable when the basic app 121 and the derivative app 122 have been removed. If the basic app 121 has been removed, for example, it may be controlled, using a history of communication performed with the external apparatus 30 using a target derivative app 122, whether to remove the target derivative app 122.

In each of the above-described exemplary embodiments, a communication history need not necessarily be used to control whether to disable a target derivative app 122. For example, whether to disable a target derivative app 122 may be controlled using a use history of the target derivative app 122 instead of a communication history of the target derivative app 122. The use history includes the number of times of use, for example, and if the number of times of use is equal to or larger than a predetermined value, the target derivative app 122 remains enabled. If the number of times of use is smaller than the predetermined value, on the other hand, the target derivative app 122 may be disabled. That is, the present disclosure may provide a management apparatus including an obtaining unit that obtains a use history of a derivative application program created on the basis of a basic application program and a state control unit that, if the basic application program is made unavailable, controls whether to make the derivative application program unavailable using the use history.

In each of the above-described exemplary embodiments, the configuration of the work cooperation system 1, the image processing apparatus 10, the terminal apparatus 20, and the external apparatus 30 is not limited to the above-described examples. For example, a printer, a scanner, a copier, or a fax machine that single-handedly achieves the functions of the image processing apparatus 10 may be provided instead of the image processing apparatus 10. Alternatively, a part of the functions of the image processing apparatus 10 may be achieved by another apparatus. Furthermore, a part of the functions of the terminal apparatus 20 may be achieved by another apparatus, instead. For example, the image processing apparatus 10 may display the setting screen 221 and receive an operation performed by the user instead of the terminal apparatus 20.

In each of the above-described exemplary embodiments, the processing steps performed by the work cooperation system 1, the image processing apparatus 10, the terminal apparatus 20, and the external apparatus 30 are not limited to the above-described examples. The processing steps may be reordered insofar as no contradictions are caused. In addition, the present disclosure may be implemented as a method including the processing steps performed by the work cooperation system 1, the image processing apparatus 10, the terminal apparatus 20, and the external apparatus 30.

The present disclosure may be implemented as a program executed by the image processing apparatus 10, the terminal apparatus 20, or the external apparatus 30. The program may be downloaded through a communication line such as the Internet or provided in a computer readable storage medium such as a magnetic storage medium (a magnetic tape, a magnetic disk, etc.), an optical storage medium (an optical disc, etc.), a magneto-optical storage medium, or a semiconductor memory.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A management apparatus comprising:
an obtaining unit that obtains a history of communication performed with an external apparatus in accordance with a derivative application program created on a basis of a basic application program; and
a state control unit that, if the basic application program is made unavailable, controls, using the history of communication, whether to make the derivative application program unavailable.

2. The management apparatus according to claim 1,
wherein the history of communication includes a number of times of communication performed with the external apparatus, and
wherein, if the number of times of communication is equal to or larger than a predetermined number, the state control unit keeps the derivative application program available.

3. The management apparatus according to claim 1,
wherein the history of communication includes a number of times of communication performed with the external apparatus, and
wherein, if the number of times of communication is equal to or smaller than a predetermined number, the state control unit makes the derivative application program unavailable.

4. The management apparatus according to claim 2,
wherein the history of communication includes the number of times of communication performed with the external apparatus, and
wherein, if the number of times of communication is equal to or smaller than the predetermined number, the state control unit makes the derivative application program unavailable.

5. The management apparatus according to claim 1,
wherein the obtaining unit also obtains length of a period for which the basic application program remains unavailable, and
wherein, if the history of communication indicates that communication has been performed with the external apparatus and the length of the period is equal to or shorter than a predetermined value, the state control unit keeps the derivative application program available.

6. The management apparatus according to claim 1,
wherein the obtaining unit also obtains length of a period for which the basic application program remains unavailable, and
wherein, if the length of the period is equal to or longer than a predetermined value, the state control unit makes the derivative application program unavailable.

7. The management apparatus according to claim 5,
wherein the obtaining unit also obtains the length of a period for which the basic application program remains unavailable, and
wherein, if the length of the period is equal to or longer than the predetermined value, the state control unit makes the derivative application program unavailable.

8. The management apparatus according to claim 1,
wherein the obtaining unit also obtains content of a reason for making the basic application program unavailable, and
wherein the state control unit controls, using the history of communication and the reason, whether to make the derivative application program unavailable.

9. The management apparatus according to claim 8,
wherein the reason includes a condition relating to encryption of communication that is not satisfied by the basic application program,
wherein the obtaining unit obtains attribute information regarding the encryption of the communication performed using the derivative application program, and
wherein, if the history of communication indicates that communication has been performed with the external apparatus and the obtained attribute information satisfies the condition, the state control unit keeps the derivative application program available.

10. The management apparatus according to claim 8,
wherein the content of the reason includes a condition relating to encryption of communication that is not satisfied by the basic application program,
wherein the obtaining unit obtains attribute information regarding encryption of communication performed in accordance with the derivative application program, and
wherein, if the obtained attribute information does not satisfy the condition, the state control unit makes the derivative application program unavailable.

11. The management apparatus according to claim 9,
wherein the content of the reason includes the condition relating to the encryption of the communication that is not satisfied by the basic application program,
wherein the obtaining unit obtains the attribute information regarding the encryption of the communication performed in accordance with the derivative application program, and
wherein, if the obtained attribute information does not satisfy the condition, the state control unit makes the derivative application program unavailable.

12. The management apparatus according to claim 1,
wherein, if one of functions achieved by the basic application program is made unavailable, the state control unit controls whether to make a corresponding function achieved by the derivative application program unavailable.

13. The management apparatus according to claim 12,
wherein the obtaining unit also obtains an amount of use of the corresponding function achieved by the derivative application program, and
wherein, if the history of communication indicates that communication has been performed with the external apparatus and the amount of use is equal to or larger than a predetermined value, the state control unit keeps the corresponding function achieved by the derivative application program available.

14. The management apparatus according to claim 12,
wherein the obtaining unit also obtains an amount of use of the corresponding function achieved by the derivative application program, and
wherein, if the amount of use is smaller than a predetermined value, the state control unit makes the corresponding function achieved by the derivative application program unavailable.

15. The management apparatus according to claim 13,
wherein the obtaining unit also obtains the amount of use of the corresponding function achieved by the derivative application program, and
wherein, if the amount of use is smaller than the predetermined value, the state control unit makes the corresponding function achieved by the derivative application program unavailable.

16. The management apparatus according to claim 1,
wherein, if the basic application program is made unavailable for a predetermined period, the state control unit controls, using the history of communication, whether to make the derivative application program unavailable for the predetermined period.

17. The management apparatus according to claim 16,
wherein the obtaining unit obtains a use period of the derivative application program, and
wherein, if the history of communication indicates that communication has been performed with the external apparatus and the use period overlaps the predetermined period, the state control unit keeps the derivative application program available in a currently available period or makes the derivative application program unavailable for a part of the predetermined period.

18. The management apparatus according to claim 16,
wherein the obtaining unit obtains a use period of the derivative application program, and
wherein, if the use period does not overlap the predetermined period, the state control unit makes the derivative application program unavailable for the predetermined period.

19. The management apparatus according to claim 17,
wherein the obtaining unit obtains the use period of the derivative application program, and
wherein, if the use period does not overlap the predetermined period, the state control unit makes the derivative application program unavailable for the predetermined period.

20. A management apparatus comprising:
obtaining means for obtaining a history of communication performed with an external apparatus in accordance with a derivative application program created on a basis of a basic application program; and
state control means for, if the basic application program is made unavailable, controlling, using the history of communication, whether to make the derivative application program unavailable.

* * * * *